(12) United States Patent
Good, Jr.

(10) Patent No.: US 7,758,118 B1
(45) Date of Patent: Jul. 20, 2010

(54) CHILD SEAT RESTRAINT ALARM SYSTEM

(76) Inventor: William A. Good, Jr., 1952 Lake Acres Dr., Hickory, NC (US) 28601

(*) Notice: Subject to any disclaimer, the term of this patent is extended or adjusted under 35 U.S.C. 154(b) by 158 days.

(21) Appl. No.: 12/069,507

(22) Filed: Feb. 11, 2008

(51) Int. Cl.
*A47C 7/62* (2006.01)
*A47D 1/00* (2006.01)

(52) U.S. Cl. .................. 297/217.4; 297/256.17

(58) Field of Classification Search .......... 297/217.3, 297/217.4, 256.17, 468
See application file for complete search history.

(56) References Cited

U.S. PATENT DOCUMENTS

| | | | | |
|---|---|---|---|---|
| 4,553,625 | A * | 11/1985 | Tsuge et al. | 180/268 |
| 4,813,745 | A * | 3/1989 | Woody | 297/464 |
| 5,720,519 | A * | 2/1998 | Barnes | 280/737 |
| 5,927,806 | A * | 7/1999 | Ohlson | 297/256.17 |
| 6,362,734 | B1 * | 3/2002 | McQuade et al. | 340/457.1 |
| 6,448,907 | B1 * | 9/2002 | Naclerio | 340/945 |
| 6,696,943 | B1 * | 2/2004 | Elrod et al. | 340/539.1 |
| 2005/0280297 | A1 * | 12/2005 | Patterson et al. | 297/217.4 |
| 2006/0061201 | A1 * | 3/2006 | Skinner | 297/468 |
| 2006/0138819 | A1 * | 6/2006 | Omar | 297/217.3 |

OTHER PUBLICATIONS

Data sheet for BFR92A, NPN 5 Ghz wideband transistor; dated Oct. 29, 1997; 12 pages.
Allegro, A3211 and A3212, Micropower, Ultra-sensitive Hall-effect Switches, Copyright 2002, 2007; 11 pages.
Renata Batteries, 3V Lithium Batteries, Revision date of Jan. 2006, 3 pages.
Fairchild Semiconductor, BSS138, Copyright 2005; 5 pages.
Microchip HCS300, KeeLoq® Code Hopping Encoder, Copyright 2001, 28 pages.

* cited by examiner

*Primary Examiner*—Joseph F Edell

(57) ABSTRACT

A child seat restraint alarm system for use with a shopping cart of the type including a pivoting child seat and a seat belt. The alarm system includes a transmitter sending a transmission to a receiver when a child seat is down and a safety belt is closed. If no transmission is received, the receiver produces an alarm.

7 Claims, 5 Drawing Sheets

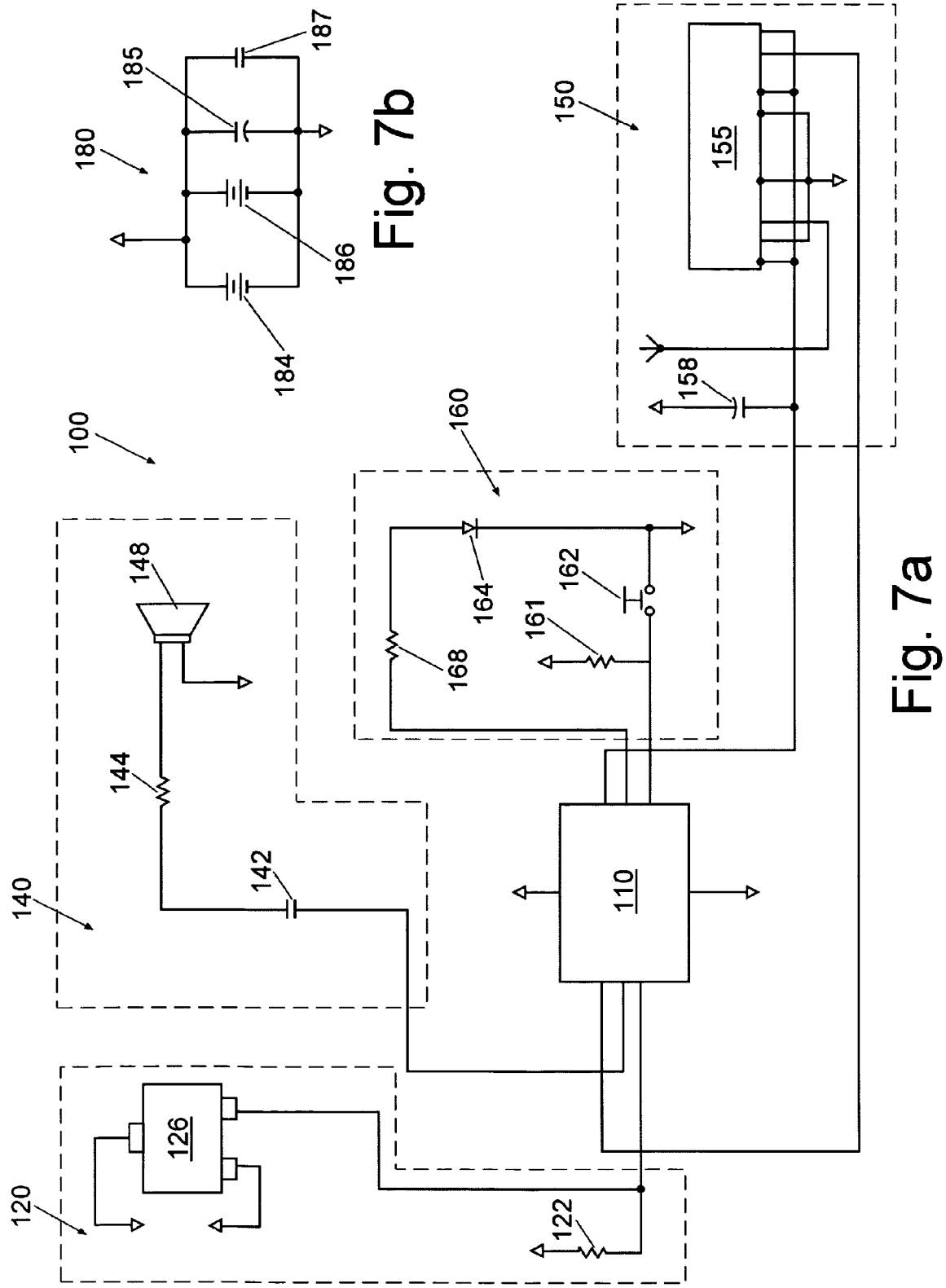

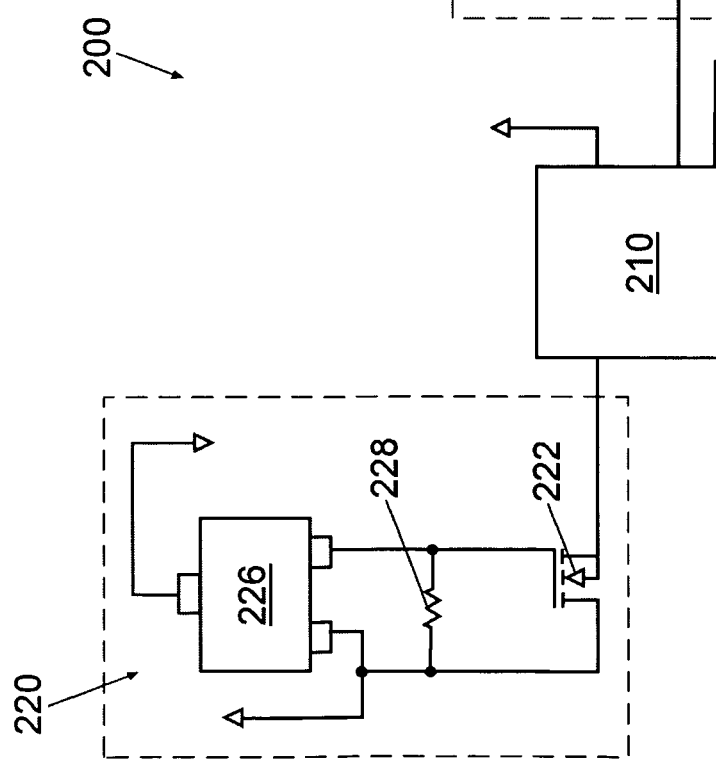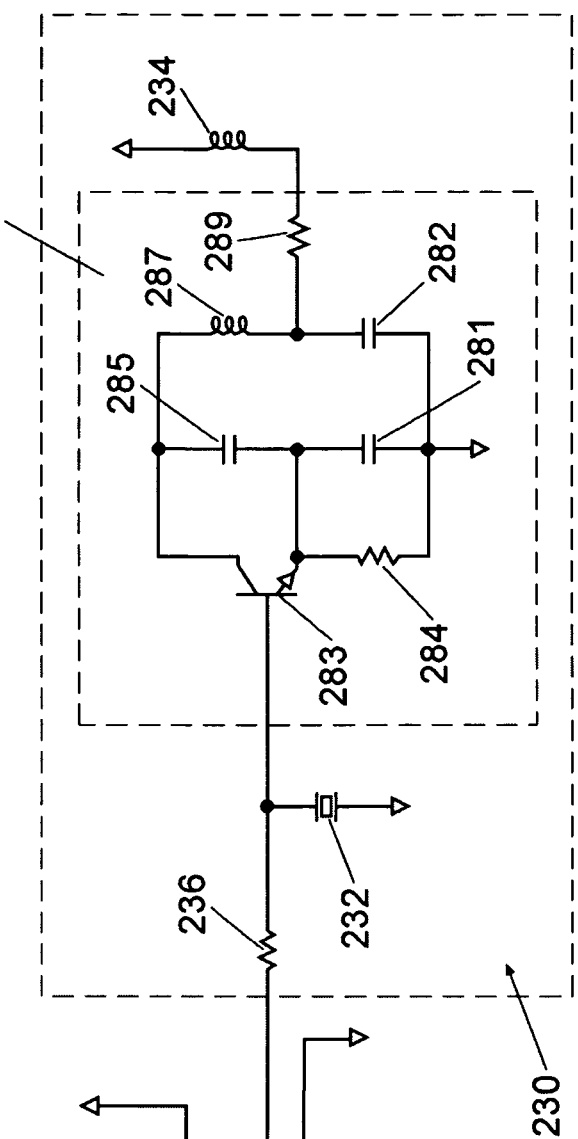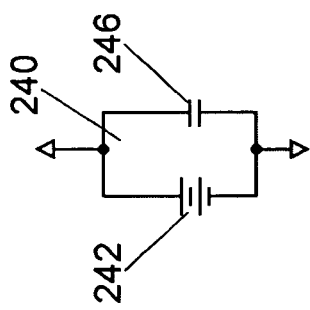

US 7,758,118 B1

CHILD SEAT RESTRAINT ALARM SYSTEM

FIELD OF THE INVENTION

The invention herein pertains to a child seat restraint alarm system primarily for use in combination with a shopping cart of the type including a child seat and a seat belt.

DESCRIPTION OF THE PRIOR ART AND OBJECTIVES OF THE INVENTION

Store owners generally endeavor to keep children safe while their parents are shopping their facility. In an effort to establish voluntary shopping cart safety criteria, ASTM has developed a directive to encourage cart manufacturers and store owners to abide by well defined parameters applicable to the shopping cart manufacturing industry, the store owners and the consumers.

Based on data from the U.S. Consumer Product Safety Commission National Electronic Injury Surveillance System, falls are among the leading causes of head injuries to young children. The most common injury related to shopping carts results when a child falls or climbs out of a cart because a restraint is not used to keep the child in a cart seat. Falls from shopping carts most often occur when a child stands up in the child seat or the basket of a cart. Falls from child seats occur when the children are not buckled into a seat properly or they wiggle out of or unbuckle seat restraints.

The ASTM directive primarily addresses the strength of seat belts and buckles and assumes that children unbuckle the belts and are no longer be restrained in a seat. The directive also suggests that the store owners should post signs encouraging customers to buckle up their children to avoid serious or even fatal accidents that result from a child falling. But there are no mechanisms in the industry that clearly warn and require parents to buckle up their children. Obviously, directives do not solve the problem unless parents follow recommendations and indeed buckle up their children.

Therefore, an objective of the present invention is to provide a child seat restraint alarm system for use in combination with a shopping cart of the type including a pivoting child's seat and a seat belt.

Another objective of the present invention is to provide a child seat restraint alarm system that is efficiently retrofitted to popular retail store shopping carts.

A further objective of the present invention is to provide a child seat restraint alarm system that sounds an audible alert if a child is not buckled into a cart seat.

Various other objectives and advantages of the present invention will become apparent to those skilled in the art as a more detailed description is set forth below.

SUMMARY OF THE INVENTION

The aforesaid and other objectives are realized by providing a child seat restraint alarm system primarily for use in combination with a shopping cart of the type including a pivoting child seat and a seat belt. In the preferred embodiment of the system, a switch determines the position of a child seat and another switch determines whether the seat belt is fastened. If the seat is down and the belt is not fastened within a predetermined time period, an alarm is provided until the belt is fastened.

BRIEF DESCRIPTION OF THE DRAWINGS

FIG. 7a is a diagram depicting schematically an exemplary electronic circuit of the receiver;

FIG. 7b is a diagram depicting schematically an exemplary power supply circuit for the receiver;

FIG. 8a is a diagram depicting schematically an exemplary circuit of the transmitter; and FIG. 8b is a diagram depicting schematically an exemplary power supply circuit for the transmitter.

DETAILED DESCRIPTION OF THE PREFERRED EMBODIMENT AND OPERATION OF THE INVENTION

Figure 1:
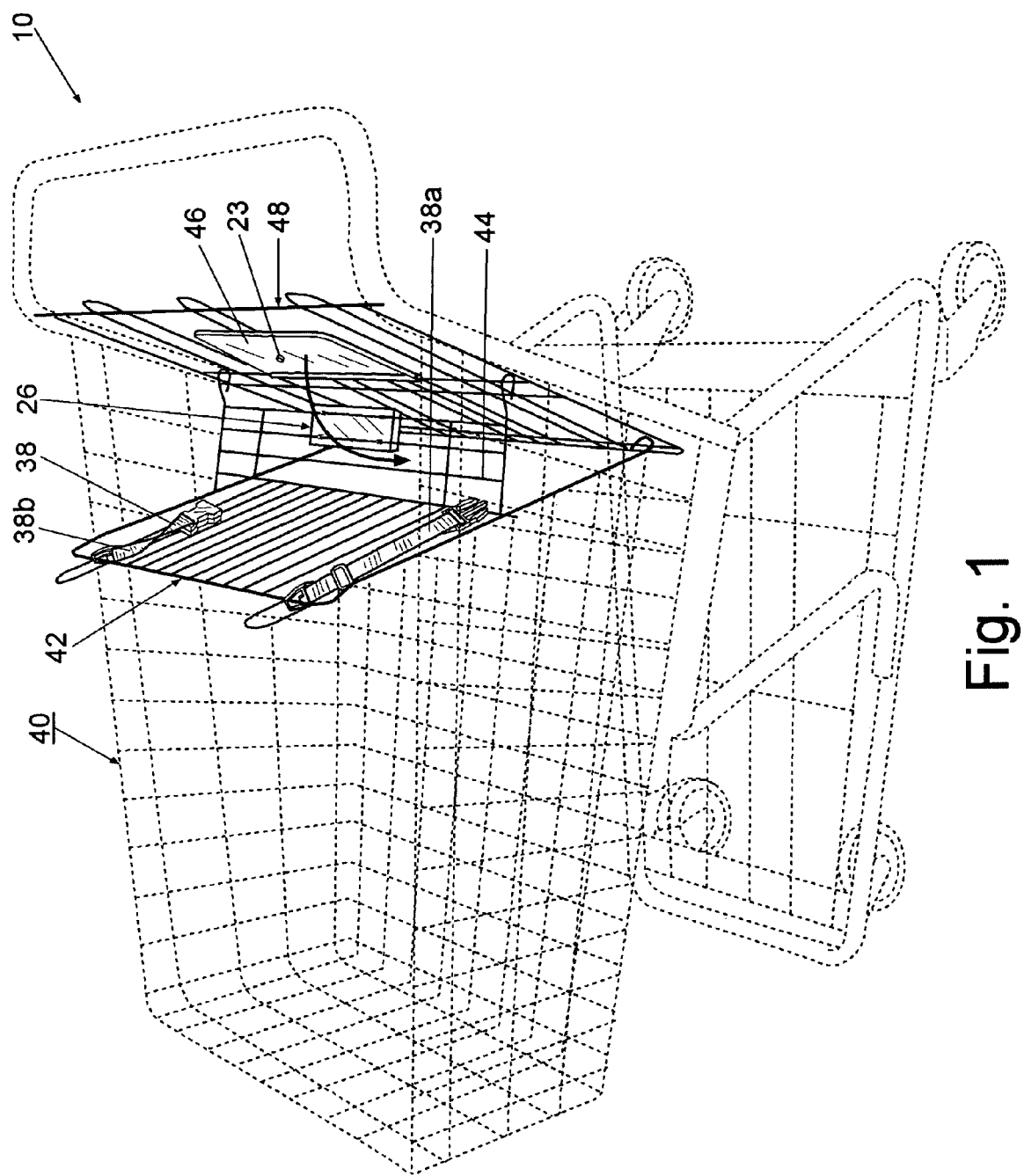
FIG. 1 shows a side perspective view of a child seat restraint alarm system with a shopping cart having a pivoting child seat.

For a better understanding of the invention and its operation, turning now to the drawings, FIG. 1 shows an exemplary embodiment of a child seat restraint alarm system 10 with shopping cart 40 including activator 23 attached to the bottom of child seat 46 which is pivotable to seat support 44 from rear wall 48 of cart 40. First 38a and second 38b ends of seat belt 38 are connected to backrest 42 pivotably connected to rear wall 48 of cart 40. Receiver 26 is fixed to seat support 44.

Figure 2:
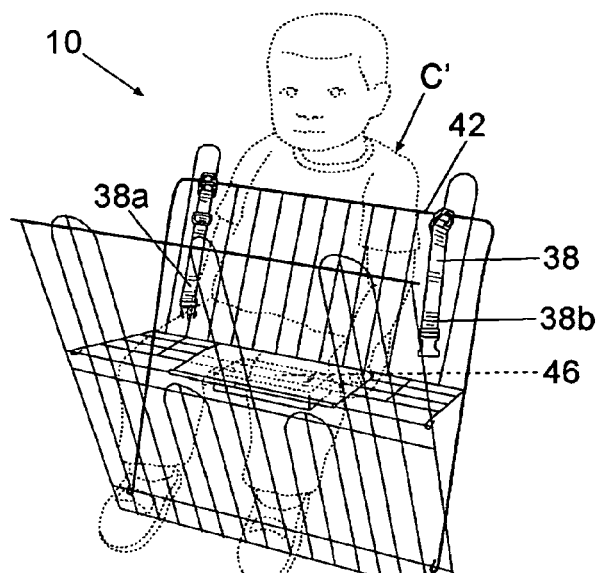
FIG. 2 is a rear perspective view of the child seat restraint alarm system with an unbuckled ghost child in the pivoting seat.
Figure 3:
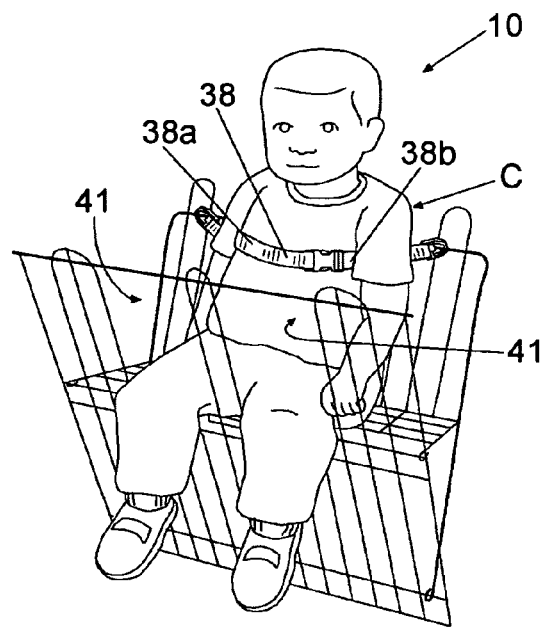
FIG. 3 is another rear perspective view of the child seat restraint alarm system and the pivoting child seat with a child buckled in the seat.

FIGS. 2 and 3 respectively feature ghost child C' and child C on child seat 46. First 38a and second 38b ends of belt 38 are connectable to retain child C (FIG. 3) in cart 40 on seat 46 with legs extending through openings 41 in rear wall 48.

Figure 4B:
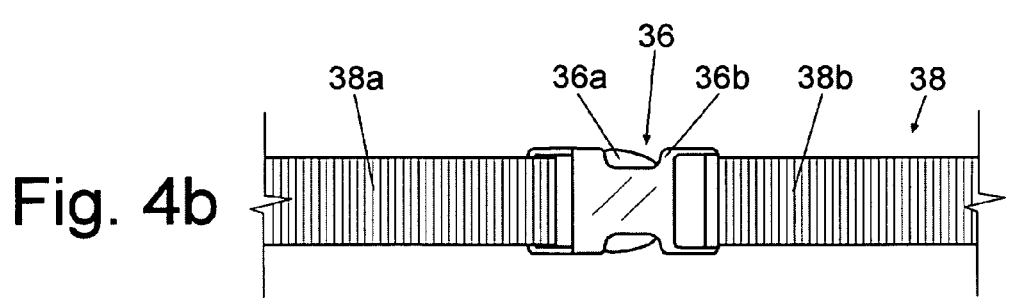
FIG. 4b is a rear view of the seat belt with the two ends connected.
Figure 4A:
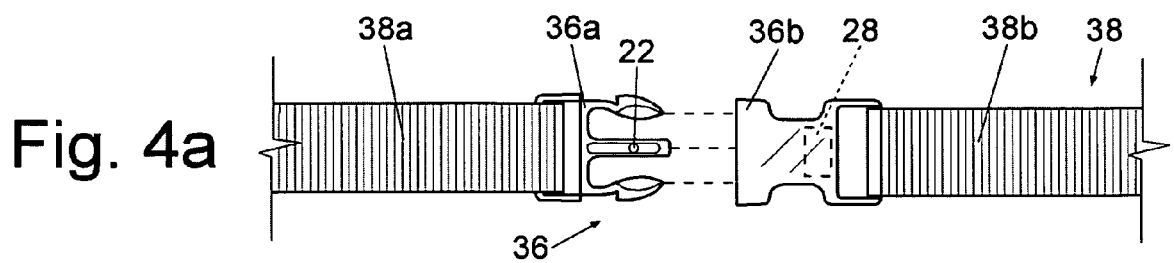
FIG. 4a is a rear view of a seat belt for the pivoting child seat including the disconnected two ends.
Figure 5:
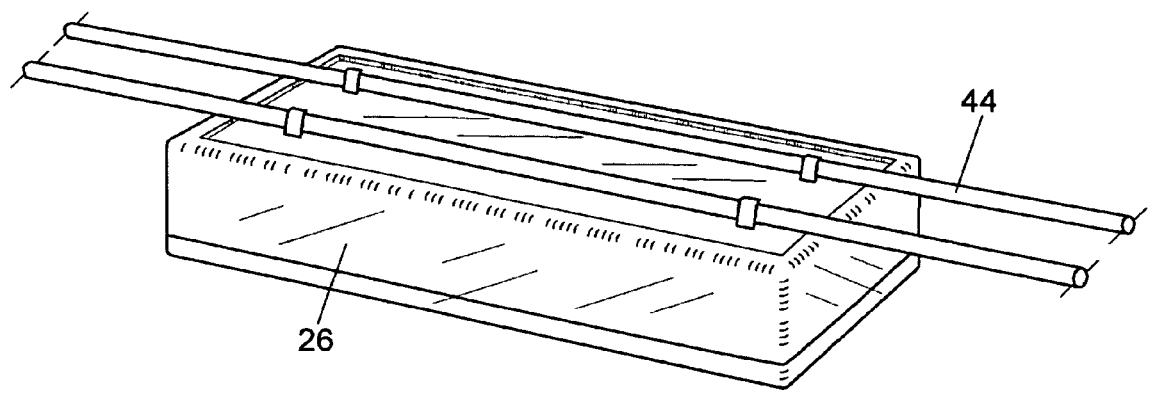
FIG. 5 is an enlarged top perspective view of a receiver for a child seat restraint alarm system.
Figure 6:
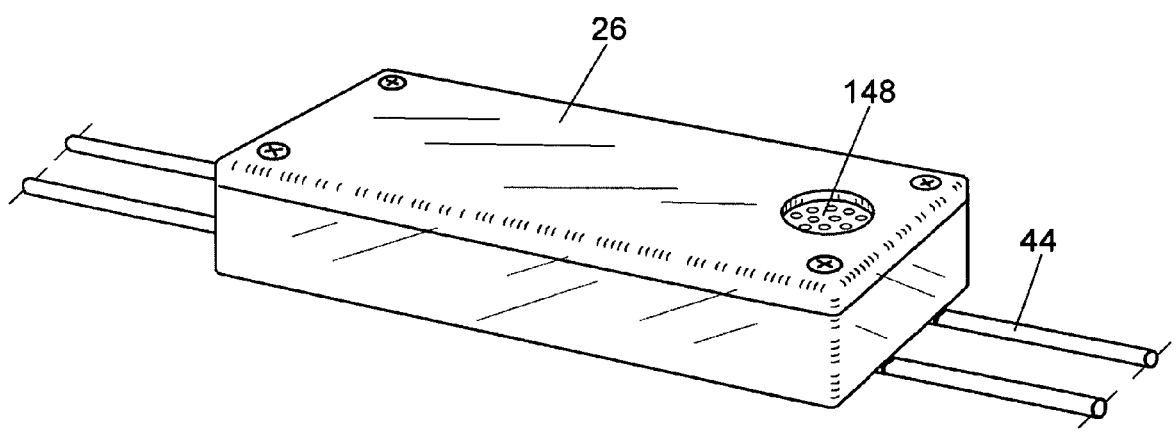
FIG. 6 is an enlarged bottom perspective view of the receiver as seen in FIG. 5.

FIGS. 4a and 4b depict fastener 36 in the form of a buckle for connecting first 38a and second 38b ends of belt 38. Fastener 36 includes male portion 36a attached to first end 38a and female portion 36b attached to second end 38b of belt 38. Transmitter 28 contained within female portion 36b determines when male portion 36a and female portion 36b are connected and fastener 36 is closed as shown in FIG. 4b or open as shown for example in FIG. 4a. In the preferred embodiment of fastener 36, activator 22 on male portion 36a activates a switch upon connection with female portion 36b as explained in more detail with reference particularly to FIG. 8a. FIGS. 5 and 6 show receiver 26 including speaker 148, shown particularly in FIG. 6, connected to seat support 44.

FIG. 7a shows schematically exemplary electronic circuitry 100 controlling operation of receiver 26 affixed to seat support 44 shown in FIGS. 1, 2, 5 and 6. Circuitry 100 includes switch circuit 120, data processor 110, alarm circuit 140, learn mode controller circuit 160 and radio receiver circuit 150.

Learn mode controller circuit 160 includes input and output to data processor 110. Switch 162 of learn mode controller circuit 160 may include a push button switch for signaling processor 110 that receiver 26 is in a learn mode. A current limiter 168 limits current to light emitting diode 164 that provides a visual indication receiver 26 is in the learn mode. Learn mode controller circuit 160 also includes a pull up device 161 for switch 162. Preferably, current limiter 168 includes a 330 ohm resistor and pull up device 161 includes a 1 megaohm resistor electrically connected as shown in FIG. 7a.

Switch circuit 120 includes switch 126 that determines whether child seat 46 is up as shown in FIG. 1 or down as shown in FIG. 2 and sends this information to data processor 110. In the preferred embodiment of circuitry 100, switch 126 includes a Hall effect switch that switches low (turns on) in the presence of a predetermined level of magnetic flux and switches high (turns off) in the absence of a predetermined level. Activator 23 affixed to child seat 46 as seen in FIG. 1 may include a magnet for producing the magnetic flux. An exemplary Hall effect switch is the A3212 Micropower, Ultrasensitive Hall Effect Switch available from Allegro Microsystems, Inc. of 115 Northeast Cutoff, Worcester, Mass. 01615-0036 and described in the 3211-DS, Rev. 6 Data Sheet publication of Allegro which is incorporated herein in its entirety by reference. Switch circuit 120 also includes a pull up device 122 that preferably includes a 1 megaohm pull-up resistor connected as shown in FIG. 7a.

Also in FIG. 7a, data processor 110 receives the seat condition data from switch circuit 120 and waits a predetermined period for a code word signal from radio receiver circuit 150, which includes demodulator circuit 155 and filter 158. In the preferred form of circuitry 100, filter 158 includes a 47 microfarad capacitor for filtering power to demodulator circuit 155. An exemplary data processor for this application is model PIC12F683 available from Microchip Technology Inc. of 2355 West Chandler Blvd., Chandler, Ariz. 85224-6199 and described in the Microchip DS41211A Data Sheet publication of 2003, which is also incorporated in its entirety herein by reference. If the code word signal is not received within the predetermined period, data processor 110 sends a signal to transducer 148 through buffer 142 and current limiter 144 in alarm circuit 140. Preferably, buffer 142 includes a 0.47 microfarad capacitor and current limiter 144 includes a 180 ohm resistor. Transducer 148 includes a 0.015 watt loudspeaker for broadcasting an audible indication that fastener 36 is not closed. The audible transmission from speaker 148 continues until receiver circuit 150 indicates to processor 110 that fastener 36 is closed.

In FIG. 7b, exemplary power supply circuit 180 for powering receiver 26 is seen for circuitry 100 including power sources 184, 186 and filters 185, 187 for protecting power sources 184, 186 from electrical spikes. Preferably, power sources 184, 186 take the form of 3 volt lithium batteries, filter 185 includes a 100 microfarad capacitor and filter 187 includes a 100 nanofarad capacitor connected as shown in FIG. 7b.

FIG. 8a is a schematic diagram showing exemplary electronic circuitry 200 for controlling operation of transmitter 28 shown in FIG. 4a within female portion 36b of fastener 36. Circuitry 200 includes switch circuit 220 for providing an input signal to data processor 210 and modulation circuit 230 for receiving data generated by processor 210 and transmitting the data over a radio frequency carrier wave.

Switch circuit 220 includes switch 226 that determines whether fastener 36 is open as shown in FIG. 4a or closed as shown in FIG. 4b and switch circuit 220 provides this information to processor 210. Preferably, switch 226 includes a Hall effect switch that turns on in the absence of a predetermined level and turns off in the presence of a predetermined level of magnetic flux produced by a magnet serving as activator 22 shown on male portion 36a of fastener 36 in FIG. 4a. An exemplary Hall effect switch 226 for this application is the A3211 Micropower, Ultrasensitive Hall Effect Switch available from Allegro Microsystems, Inc. of 115 Northeast Cutoff, Worcester, Mass. 01615-0036 and described in the 3211-DS, Rev. 6 Data Sheet publication of Allegro and incorporated herein in its entirety by reference. Inverter 222 includes a transistor that functions to invert and buffer the signal received from switch 226. An exemplary transistor for this application is the BSS138 N-channel Logic Level Enhancement Mode Field Effect Transistor available from Fairchild Semiconductor Corporation of 82 Running Hill Rd., South Portland, Me. 04106 described in the BSS138 Rev C(W) Data Sheet publication of Fairchild and incorporated herein in its entirety by reference. Preferably, switch circuit 220 also includes pull up device 228 such as a 1 megaohm resistor connected as shown in FIG. 8a.

Processor 210 generates an encoded signal that takes the form of a 66 bit code word and sends the code word signal to modulation circuit 230 upon receiving a signal indicating that fastener 36 is connected as shown in FIG. 4b. An exemplary form of processor 210 is the HCS300 KHHLoQ® Code Hopping Encoder available from Microchip Technology Inc. of 2355 West Chandler Blvd., Chandler, Ariz. 85224-6199 and described in the Microchip DS21137F Data Sheet publication of 2001, which is incorporated in its entirety herein by reference.

Modulation circuit 230 receives the code word signal from processor 210 and passes the signal through buffer 236 which takes a preferred form that includes a 47 kilo-ohm resistor. The preferred modulation circuit 230 includes a carrier wave generator 232 for producing a radio frequency wave carrying the code word signal that is tuned and amplified in amplifier circuit 280. Carrier wave generator 232 includes a saw resonator oscillating at a frequency of 433.92 megahertz. An exemplary amplifier circuit 280 includes semiconductor device 283 electrically connected to 220 ohm resistor 284, 2.2 picofarad capacitor 285, 12 picofarad capacitor 281, 20 mm trace inductor 287, 470 picofarad capacitor 282 and 47 ohm resistor 289 as shown in FIG. 8a. An exemplary semiconductor device 283 for amplifier circuit 280 is a BFR92A NPN gigahertz wide band transistor available from Philips Semiconductors of 1251 Avenue of the Americas, New York, N.Y. 10020 and described in the Oct. 29, 1997 Data Sheet publication of Philips. The amplified wave carrying the code word signal is broadcast through transmitting antenna 234 which takes the preferable form of a trace inductor.

FIG. 8b depicts schematically an exemplary power supply circuit 240 for circuitry 200 of transmitter 28. Circuit 240 includes a power source 242 and a filter 246 protecting power source 242 from electrical spikes. In the preferred form of Power supply circuit 240, power source 242 includes a 3 volt lithium battery and filter 246 employs a 100 nanofarad capacitor.

With reference to the drawings in general, the preferred method of operation of child seat restraint alarm system 10 includes learning transmitter 28 to receiver 26 by learn mode circuitry 160 since each transmitter 28 produces its own unique signal. The learning process avoids confusion where multiple transmitters 28 are transmitting in close proximity. Learning receiver 26 to transmitter 28 includes the steps of closing push button switch 162 by pivoting child seat 46 downwardly against seat support 44 before closing and then opening fastener 36. Once a receiver 26 is learned to transmitter 28, cart 40 carrying receiver 26 and transmitter 28 can be provided for shoppers to use in a conventional manner.

The preferred method includes a customer (not shown) wishing to carry child C in one of carts 40 rotating seat 46 down to its horizontal position against seat support 44 whereby activator 23 signals receiver 26. Child C can then be placed within cart 40 as seen in FIG. 3 whereby seat belt 38 is buckled by fastener 36. If fastener 36 is closed within a predetermined time period, transmitter 28 within fastener 36 sends a radio frequency transmission to receiver 26 beneath seat support 44 that prevents or silences an alarm and the customer continues about his or her shopping as normal with child C securely restrained in cart 40. Preferably, this radio frequency transmission continues for at least a few seconds. Most preferably, the transmission continues for at least 25 seconds. If fastener 36 is not closed within the predetermined time period, no signal is transmitted from transmitter 28 in fastener 36, and receiver 26 provides an audible alarm through speaker 148 alerting the customer to close buckle fastener 36. Activator 22 on male portion 36a upon connection with transmitter 28 in female portion 36b confirms closure of fastener 36 thereby signaling receiver 26 causing the audible alarm from speaker 148 to stop. The predetermined delay period prior to alarm is about 5 seconds to about 15 seconds in the preferred embodiment of the invention with about a 10 second delay being most preferred.

The illustrations and examples provided herein are for explanatory purposes and are not intended to limit the scope of the appended claims.

I claim:

1. A child seat restraint alarm system for a shopping cart comprising:
   a seat support, said seat support positioned on the shopping cart,
   a receiver, said receiver connected to said seat support,
   a seat, said seat pivotable from an upright position downwardly to contact said seat support,
   a seat activator, said seat activator located on said seat to activate said receiver when said seat is pivoted downwardly from the upright position to said seat support,
   a belt, said belt attached to the shopping cart proximate said seat, said belt comprising a first end and a second end, said belt first end connectable to said belt second end,
   a transmitter, said transmitter positioned on said belt second end,
   a belt activator, said belt activator attached to said belt first end whereby placing a child in said seat pivoted to a horizontal position against said seat support causes said seat activator to activate said receiver for sounding an audible alarm if no signal is received from said transmitter within a predetermined time period, and whereby connecting said belt first end around the child to said belt second end within said predetermined time period causes said belt activator to activate said transmitter to signal said receiver for preventing the sounding of said audible alarm.

2. The child seat restraint alarm system of claim 1 wherein said receiver comprises a Hall effect switch.

3. The child seat restraint alarm system of claim 1 wherein said transmitter produces a radio frequency signal for reception by said receiver.

4. The child seat restraint alarm system of claim 1 wherein said receiver and said transmitter each comprise a power source.

5. The child seat restraint alarm system of claim 1 wherein said receiver comprises a learn mode control circuit.

6. The child seat restraint alarm system of claim 1 wherein said receiver and said transmitter each comprise a data processor circuit.

7. The child seat restraint alarm system of claim 1 wherein said seat activator comprises a magnet.

* * * * *